United States Patent [19]
Hill

[11] Patent Number: 5,927,679
[45] Date of Patent: Jul. 27, 1999

[54] ADJUSTABLE VEHICLE SEAT SUSPENSION

[75] Inventor: Kevin E. Hill, Mequon, Wis.

[73] Assignee: Milsco Manufacturing Company, Milwaukee, Wis.

[21] Appl. No.: 08/839,925

[22] Filed: Apr. 21, 1997

[51] Int. Cl.⁶ .................................................. F16M 13/00
[52] U.S. Cl. ...................... 248/588; 248/421; 297/344.15
[58] Field of Search .................... 348/588, 564, 348/584, 162.1, 421, 419, 280.11, 292.11; 297/344.15, 344.16

[56] References Cited

U.S. PATENT DOCUMENTS

| | | |
|---|---|---|
| 974,769 | 11/1910 | Hoff . |
| 3,390,857 | 7/1968 | Nyström . |
| 3,826,457 | 7/1974 | Huot De Longchamp ......... 248/421 X |
| 3,873,055 | 3/1975 | White . |
| 3,874,626 | 4/1975 | Gross et al. ........................ 248/421 X |
| 3,984,078 | 10/1976 | Sturhan ................................ 248/421 X |
| 4,148,518 | 4/1979 | Vilbeuf . |
| 4,312,491 | 1/1982 | Aondetto . |
| 4,350,317 | 9/1982 | Aondetto . |
| 4,382,573 | 5/1983 | Aondetto . |
| 4,573,657 | 3/1986 | Sakamoto ............................ 248/421 X |
| 4,659,052 | 4/1987 | Nagata ................................ 248/421 X |
| 4,687,250 | 8/1987 | Esche . |
| 4,729,539 | 3/1988 | Nagata . |
| 4,768,762 | 9/1988 | Lund . |
| 4,813,645 | 3/1989 | Iwami . |
| 4,880,201 | 11/1989 | Hall et al. . |
| 4,890,810 | 1/1990 | Sakamoto . |
| 4,926,760 | 5/1990 | Sack . |
| 4,941,641 | 7/1990 | Granzow et al. . |
| 5,058,852 | 10/1991 | Meier et al. . |
| 5,169,112 | 12/1992 | Boyles et al. ........................ 248/421 X |
| 5,222,709 | 6/1993 | Culley, Jr. et al. . |
| 5,251,864 | 10/1993 | Itou . |
| 5,261,724 | 11/1993 | Meiller et al. ...................... 297/344.15 |
| 5,273,260 | 12/1993 | Nagata ............................ 297/344.15 X |
| 5,285,992 | 2/1994 | Brown ...................................... 248/421 |
| 5,364,060 | 11/1994 | Donovan et al. . |
| 5,533,703 | 7/1996 | Grassl et al. ........................ 248/421 X |
| 5,580,027 | 12/1996 | Brodersen . |
| 5,676,424 | 10/1997 | Winkelhake ........................ 248/421 X |

Primary Examiner—Derek J. Berger
Assistant Examiner—Long Dinh Phan
Attorney, Agent, or Firm—Nilles & Nilles, S.C.

[57] ABSTRACT

A vehicle seat suspension having a scissors arm linkage disposed between a platform and base with a link pivotally connected at one end to a scissor arm of the linkage at a point spaced from a pivot interconnecting scissor arms of the linkage and operably connected at its other end to a slide carried by the platform for communicating scissor linkage motion to a spring carrier also connected to the link. The carrier includes at least one coil spring held captive preferably in compression between two spaced apart brackets, one of which is pivotally connected to the end of the link adjacent the slide. The point of pivotal attachment of the link to the scissor arm is spaced from the linkage pivot to create a moment about the pivot tending to resist collapse of the linkage when force from the spring is communicated to the linkage. To adjust suspension weight resistance, the brackets are in communication with a rod attached to a knob that is rotated to change the distance between the brackets thereby changing the amount by which the spring is compressed. To change seat height, another knob is rotated to move the rod, springs, and brackets in substantially unison toward or away from the front of the suspension causing the linkage to controllably expand or collapse. By this suspension construction, weight adjustment is advantageously substantially independent of height adjustment.

67 Claims, 7 Drawing Sheets

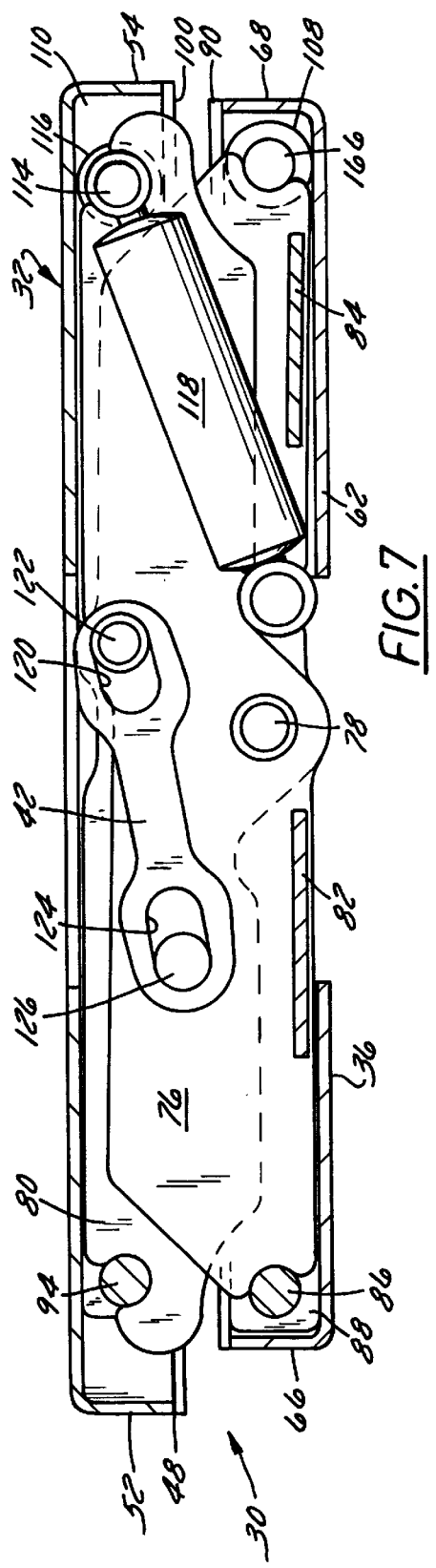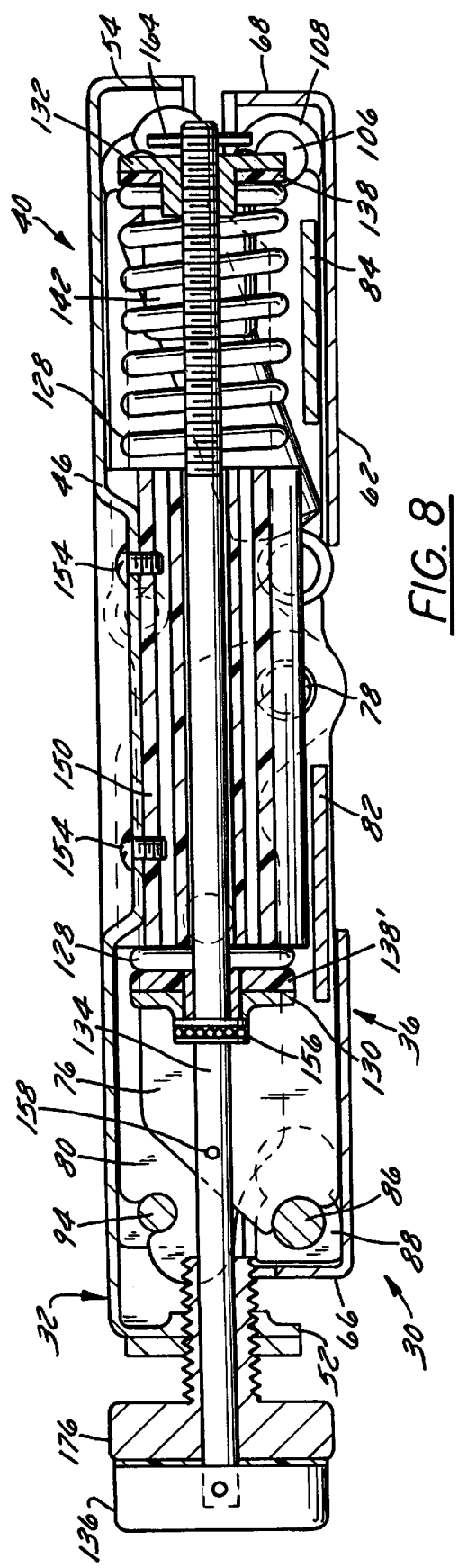

5,927,679

ADJUSTABLE VEHICLE SEAT SUSPENSION

FIELD OF THE INVENTION

This invention relates generally to a suspension for a vehicle seat and more particularly to a scissors-type seat suspension having a height and weight adjustment assembly which allows the suspension to be adjusted to change seat height without substantially affecting to its resistance to a load applied to the suspension.

BACKGROUND OF THE INVENTION

Vehicle seat suspensions are used to support a person sitting in a seat while also absorbing bumps and jolts encountered by the vehicle during operation to make the seat occupant's ride as comfortable as possible. While a seat suspension designer's job has always been difficult in achieving these goals, their job today is even more complicated because they are being asked to design suspensions that are more compact, lighter in weight, cheaper to build, more durable, and which offer greater comfort. Furthermore, for seat suspensions being designed for the European market, the suspension must also possess favorable natural frequency characteristics and pass strict ISO tests.

For off-road vehicle seating applications, the seat suspension must be extremely rugged while providing comfort to a seat occupant who can be subjected to rather severe operating conditions and rough terrain. Often, different people will use the equipment at different times, requiring the seat suspension to be adjustable for both the height of the seat and the weight of the seat occupant.

Suspensions which utilize scissor linkages are a common choice for off-road vehicle seat designers because they are robust, strong, durable, inexpensive and reliable. Moreover, they can be adapted to be adjustable both for changing seat height and for accommodating different seat occupant weights.

Unfortunately, for many of these suspensions, if not all of them, seat height and weight adjustment cannot be done independently of each other. More specifically, adjusting seat height changes the weight resisting characteristics of the suspension and adjusting the weight resisting characteristics of the invention changes seat height. Moreover, the two adjustment mechanisms also take up space thereby limiting how compact the suspension can be made. Additionally, since they are separate but interrelated mechanisms, the height and weight adjustment mechanisms use different components adding to the cost of the suspension.

With off-road vehicle equipment manufacturers demanding better, smaller and cheaper seat suspensions, there is a growing need for a seat suspension of compact construction which utilizes a seat height and weight adjustment assembly having a majority of common components for reducing cost while enabling seat height adjustment to be performed independently of weight adjustment and weight adjustment to be performed independently of height adjustment.

SUMMARY OF THE INVENTION

A seat suspension for a vehicle seat that preferably is used in off-road vehicles having a platform spaced from a base by a scissor arm linkage assembly coupled to springs of the suspension by a pair of links each constrained for substantially linear fore-aft motion in a slide assembly carried by the seat platform. The springs form part of a spring carrier assembly that can be moved as a unit to increase or decrease the height of the seat platform. Each spring preferably is a coil spring held captive between a pair of spaced apart brackets one of which preferably is movable relative to the other of the brackets for enabling the tensioning of the springs to be adjusted to change the firmness or softness of the suspension thereby enabling the characteristics of the suspension to be adjusted for the weight of a seat occupant.

Because movement of the springs to adjust seat height does not change the distance between the spring brackets, height adjustment preferably does not affect weight adjustment. Because changing the distance between brackets does not move the portion of the spring carrier coupled to the links, the height of the seat platform does not change making weight adjustment substantially independent of height adjustment.

The scissor linkage assembly preferably comprises a pair of laterally spaced apart scissor arm linkages located between the platform and base with one of the scissor arm linkages disposed adjacent each side of the seat suspension. Each scissor arm linkage comprises an inner scissor arm pivotally coupled by a pivot pin to an outer scissor arm enabling the inner and outer arms of a scissor arm linkage to angularly move relative to each other.

One end of each arm is pivotally connected to one of either the platform or the base and the other end of each arm is slidably pivotally connected to the other of either the base or the platform. In a preferred embodiment, each inner link of a scissor arm linkage is pivotally connected to the base at its bottom end and slidably received in a track in the platform at its top end and each outer link is pivotally connected at its top end to the platform and slidably received in a track in the base at its bottom end. Each slidably received end of each arm preferably is attached to a roller bearing or bearing block that is received in the track.

In operation of each scissor arm linkage, the angle between the two arms decreases as the scissor arm linkage collapses during application of a load to the suspension permitting the seat platform to move downwardly toward the base in a controlled manner. As the applied load decreases, the angle between pivotally attached arms increases and the distance between the platform and base increases.

The spring carrier includes a pair of springs that are preferably coil springs held captive in compression between a pair of brackets that are carried on a rotatable weight adjustment rod. The weight adjustment rod has a threaded portion that threadably engages one of the spring brackets for enabling the one bracket to be moved relative to the other bracket to change the amount of compression the brackets apply to the spring to make the suspension softer or more firm depending upon the direction of the adjustment rod rotation. To rotate the rod to adjust the firmness or softness of the suspension, the free end of the rod that extends outward from the suspension has a knob that can be manually grasped and turned.

In a preferred suspension embodiment, relative movement of a front spring bracket toward the front of the platform is limited by a stop carried by the rod. Relative movement of the front bracket toward the rear of the platform is only limited by the force of the springs resisting compression.

The end of the rod opposite the knob preferably is threadably engaged with the rear spring bracket such that rotation of the rod moves the rear bracket in an axial direction along the rod. In this manner, rotation of the weight adjustment knob rotates the rod moving the rear spring bracket toward or away from the front of the platform increasing or decreasing the amount of compression applied by the brackets to the springs. By changing the amount of compression, it in effect preloads the springs making them more firm or softer enabling the firmness of the suspension to be adjusted for the weight of the seat occupant. A pin or retainer adjacent the free end of the threaded portion of the rod preferably prevents the rear bracket from disengaging from the rod.

To prevent the springs from sliding off the brackets, each bracket has a keeper with a generally cylindrical outwardly extending boss each of which is received in the interior hollow portion of a spring. The keepers keep each spring captive by preventing them from sliding away from the generally centrally located weight adjustment rod. To prevent each spring from buckling in the middle, each spring preferably is constrained by a substantially rigid sleeve. The sleeves for both springs preferably form a unitary component that can be attached by a fastener to the bottom of the seat platform.

Each connecting link couples scissor arm linkage assembly to the springs by operably connecting each scissor arm linkage to the springs. Each link has one end pivotally connected to a pin that extends inwardly from the inner scissor arm and its other end operably connected to the springs by being pivotally connected to the front spring bracket. The connecting link pin is offset from the pivot pin pivotally connecting both arms of the scissor arm linkage to create a moment about the pivot pin for transmitting forces encountered by the suspension through the scissor arm linkages to the springs and from the springs to the scissor arm linkages during seat height adjustment.

Each link is pivotally connected to a pin which extends outwardly from the front bracket and which is received in a slide assembly that helps constrain the front bracket to substantially linear motion during operation. Preferably, the pin extends outwardly from a bent tab of the front bracket and has a bearing attached to its free end which is slidably or rotatively received in a track that is a generally U-shaped channel attached to the bottom of the spring platform. Preferably, the bearing is a bearing block slidably received in the channel but can be a roller rotatively received in the channel.

To adjust the height of the suspension to change seat height, the weight adjustment rod is telescopically received through a weight adjustment knob that has its stem threaded into the front wall of the seat platform. Rotation of the height adjustment knob moves the entire spring carrier assembly, including both springs, their brackets and keepers, and the weight adjustment rod, forwardly or rearwardly relative to the front of the seat platform to collapse or expand the scissor arm linkages thereby lowering or raising the seat carried by the platform.

For example, as the height adjustment knob is rotated such that it moves the spring carrier assembly toward the front of the platform, it moves both connecting link pins on the front bracket forwardly causing a force to be transmitted along each link to the inner scissor arms creating moments about the scissor arm pivot pins thereby causing the scissor arm linkages to expand thereby increasing the distance between the platform and base increasing seat height. Conversely, rotation in the opposite direction collapses the scissor arm linkages thereby decreasing seat height.

In operation, a load encountered by the suspension is transmitted from the inner scissor arm of each scissor arm linkage to the connecting link which in turn transmits the load to the front spring bracket. The load causes the front spring bracket to compress at least slightly the springs causing the springs to resist collapse of the suspension. During compression, the scissor arm linkages collapse at least somewhat until the load is dissipated by the springs. As the load is dissipated by the springs, the springs exert an opposite reaction force which decompresses each spring, transmits a corresponding force to the connecting links which, in turn, transmit the force to the scissor arm linkages causing them to expand and return substantially to their original uncollapsed position.

As a result of the construction of this suspension, the suspension preferably has nearly linear force/load-deflection characteristics. Preferably, the suspension of this invention has a relatively low natural frequency of below about four hertz making it suitable for ISO applications which require a relatively low natural frequency.

Objects, features and advantages of this invention are to provide a suspension for a vehicle seat that can support a load placed on its seat platform; is of compact construction able to fit in a relatively small space; is able to absorb loads applied to the suspension due to jolts, bumps and shocks encountered during operation of a vehicle; utilizes a pair of linearly constrained links which communicate a load encountered by the suspension from the scissor arm linkages to the springs all of which advantageously results in a suspension of compact construction; utilizes few components making the suspension inexpensive and simple to manufacture; allows weight adjustment of the seat suspension to be advantageously performed without affecting its height adjustment; allows height adjustment of the suspension to be performed without substantially affecting its weight adjustment; is a suspension which allows for a wide range of height and weight adjustment settings for accommodating seat occupants of a wide variety of sizes and weights; is a suspension that can be constructed and arranged to have a low natural frequency which is not easily excited into instability; is a suspension which can be constructed and arranged to have a stability-enhancing natural frequency that is below four hertz; and is a seat suspension that is strong, rugged, easy to assemble, durable, of simple design, compact construction, economical manufacture and which is easy to use and operate.

BRIEF DESCRIPTION OF THE DRAWINGS

These and other objects, features, and advantages of this invention will become apparent from the following detailed description of the best mode, appended claims, and accompanying drawings in which:

FIG. 7 is a sectional view in a collapsed shipping position; and

FIG. 8 is a sectional view of the suspension in its collapsed shipping position showing the location of the components of the spring carrier assembly.

DETAILED DESCRIPTION OF THE INVENTION

Figure 1:
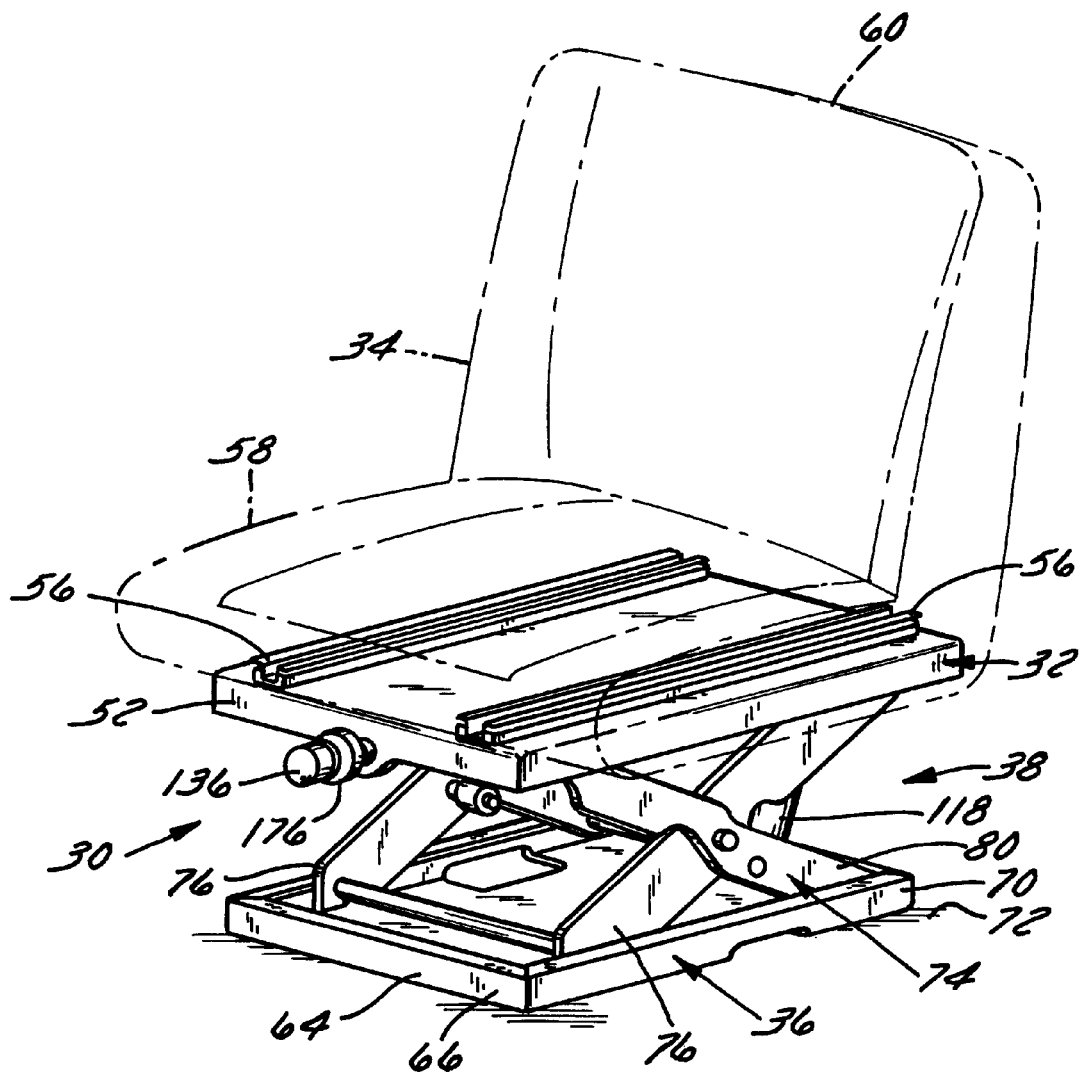
FIG. 1 is a perspective view of a scissor arm linkage seat suspension.

FIGS. 1–8 illustrate a seat suspension 30 of this invention having a platform 32 carrying a seat 34 (shown in FIG. 1 in phantom) and overlying a base 36 with a scissor linkage assembly 38 spacing the platform 32 apart from the base 34 and permitting the platform 32 to move up and down relative to the base 34 in response to jolt, bumps, shocks and other loads encountered by the suspension 30 during operation. To resist collapse of the scissor linkage assembly 38, a spring carrier assembly 40 is coupled to the scissors linkage assembly 38 by links 42 which each have an end generally linearly constrained by a slide assembly 44 carried by the platform 32. The spring carrier assembly 40 is also constructed and arranged to permit adjustment of the height of a seat 34 mounted on the platform 32 independently of adjustment of resistance to seat occupant weight, and vice versa, all in a seat suspension 30 that is compact, lightweight, strong and durable. In use, the seat suspension 30 of this invention is used for supporting vehicle seats 34 and is particularly well suited for use in vehicles capable of off road use, such as for example, heavy equipment, semi trucks, dump trucks, front-end loaders, graders, lift trucks, caterpillars, backhoes, earth movers, farm tractors, bailers, combines, harvesters, produce pickers, garden tractors, turf-care equipment, and other similar vehicles requiring a seat suspension.

Figure 6:
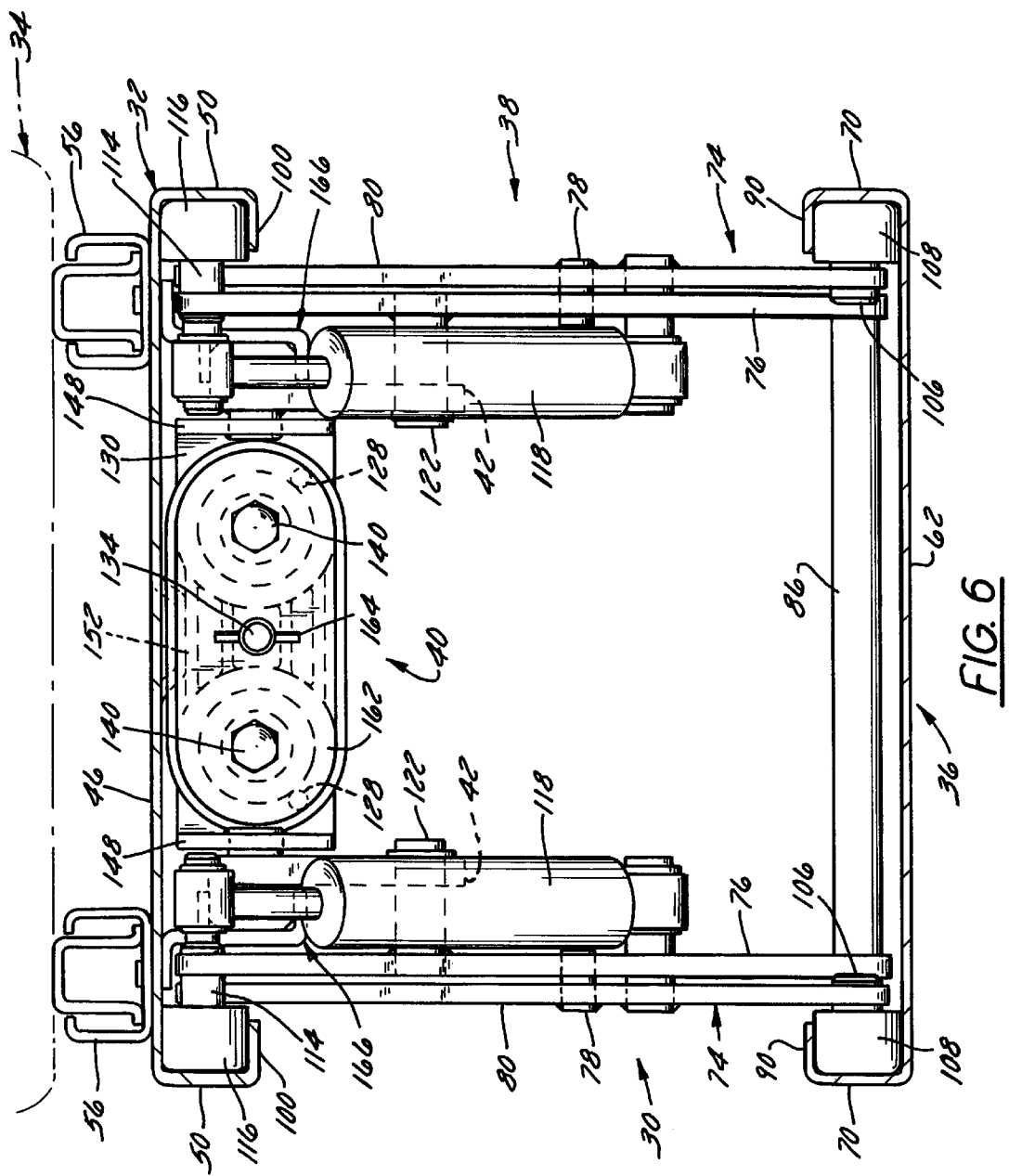
FIG. 6 is a sectional view of the suspension taken along line 6—6 of FIG. 5 showing the end of the spring carrier assembly.

The seat platform 32 is constructed of a plate 46 of substantially rigid material that preferably is a metal such as sheet steel, aluminum, titanium or the like. The platform 32 is constructed with a downturned flange 48 generally about its periphery that forms sidewalls 50, a front wall 52 and a rear wall 54. As is shown in FIGS. 1 & 6, the seat 34 is mounted to the top of the platform 32 with the scissor linkage assembly 38 disposed underneath the bottom of the platform plate 46. The seat 34 preferably rides on seat slides 56 on top of the platform 32 which permit the seat 34 to move forwardly or rearwardly along the platform 32. The seat 34, shown in phantom in FIG. 1, has a seat cushion 58 and a backrest 60 and can be a bucket type seat, if desired.

The seat base 34 is also constructed of a plate 62 of substantially rigid material that preferably is a metal such as steel, aluminum, titanium or the like. The base 34 underlies both the platform 32 and the scissor linkage assembly 38. The base 34 has an upturned flange 64 about its periphery preferably which defines a front wall 66, a rear wall 68 and sidewalls 70. The base 34 preferably is mounted to a floor, frame or chassis 72 of a vehicle (FIG. 1) preferably by bolts (not shown). If desired, the base 34 can be integral with the vehicle chassis or frame. The base 34 can also be unitary with the chassis or frame.

Figure 2:
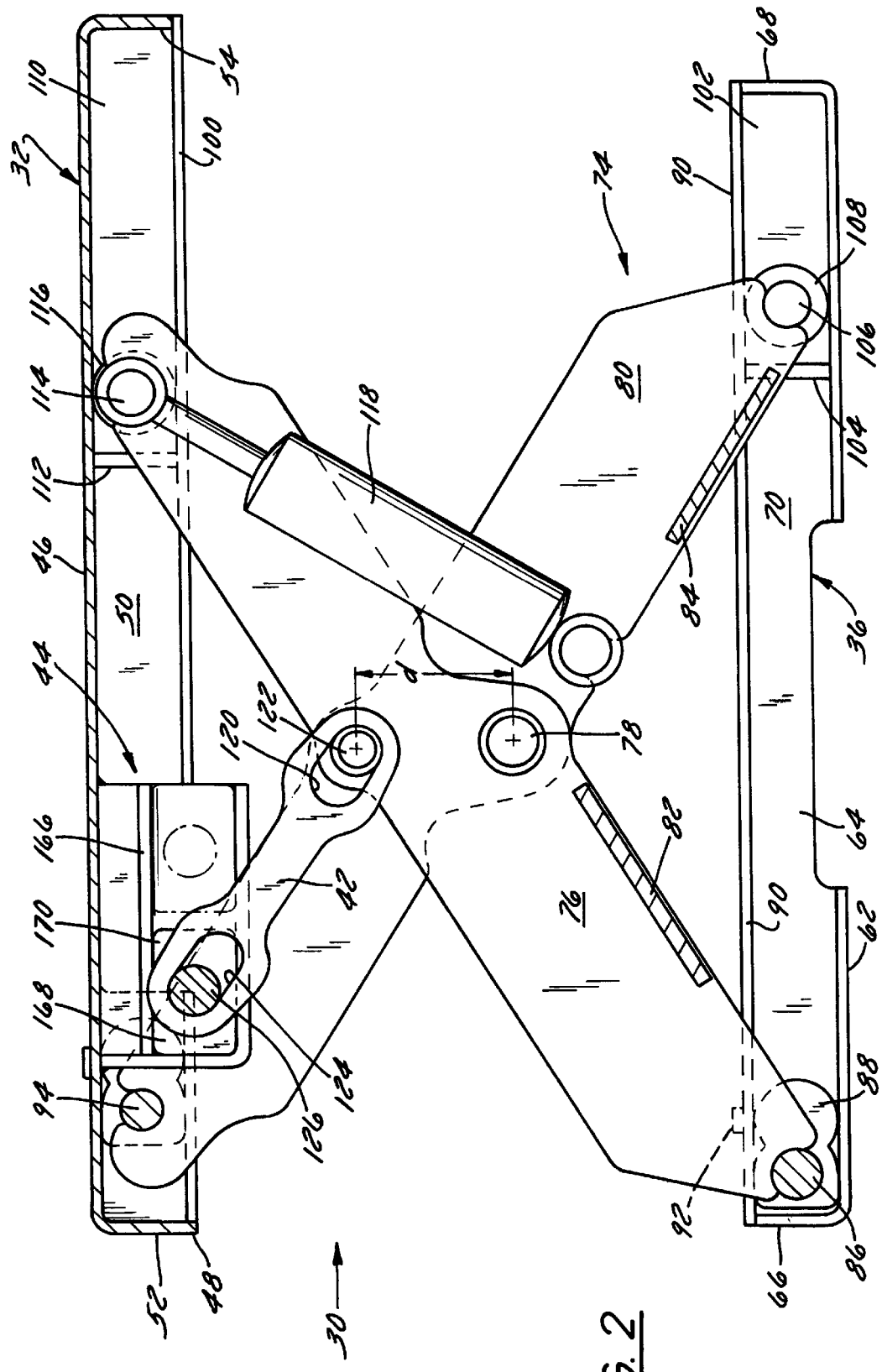
FIG. 2 is a sectional view of the suspension showing a scissor arm linkage connected by a link to a slide assembly of this invention.
Figure 3:
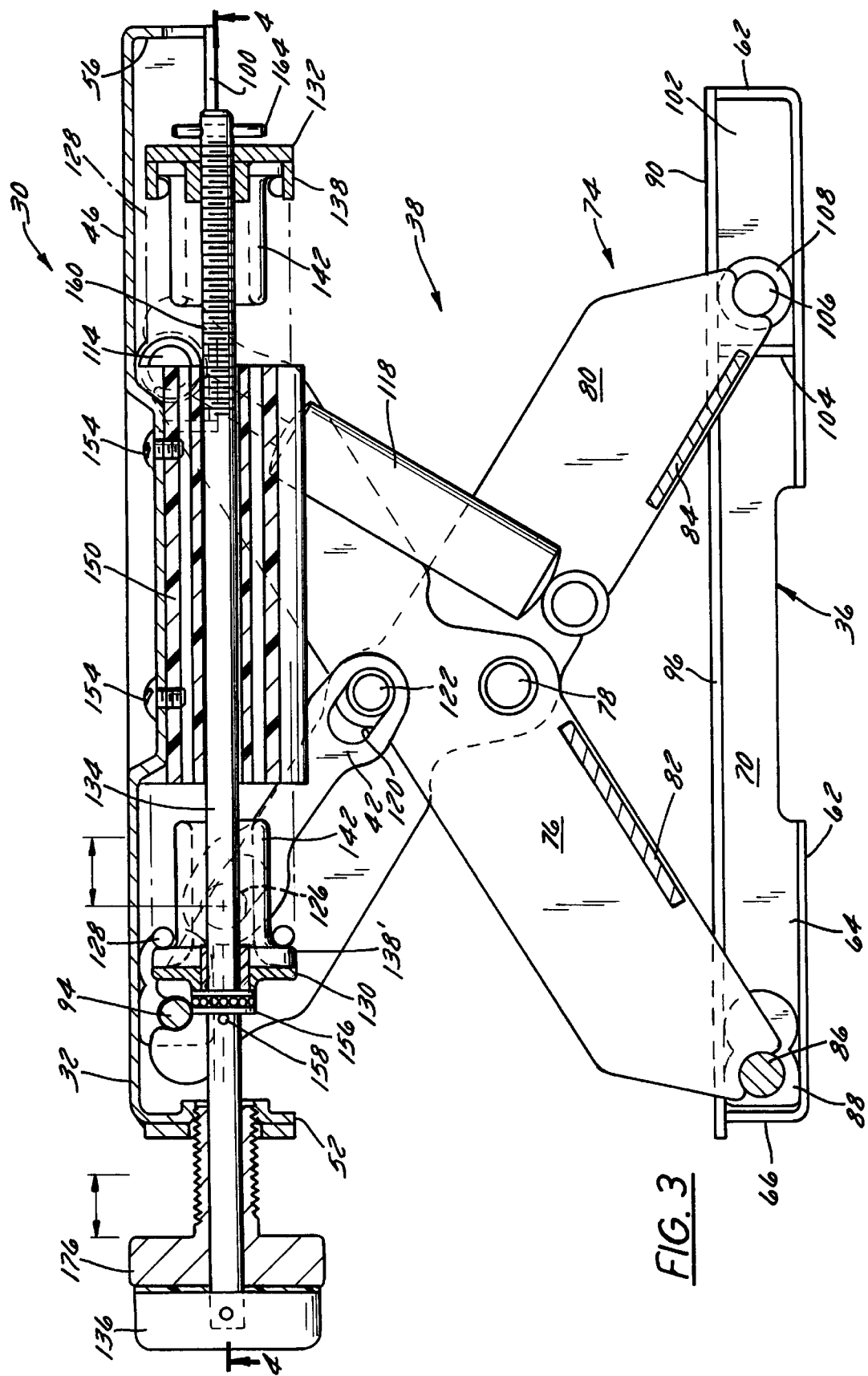
FIG. 3 is a sectional view of the suspension showing coil springs mounted in a spring carrier assembly underneath a seat supporting platform of the suspension.
Figures 5, 5A:
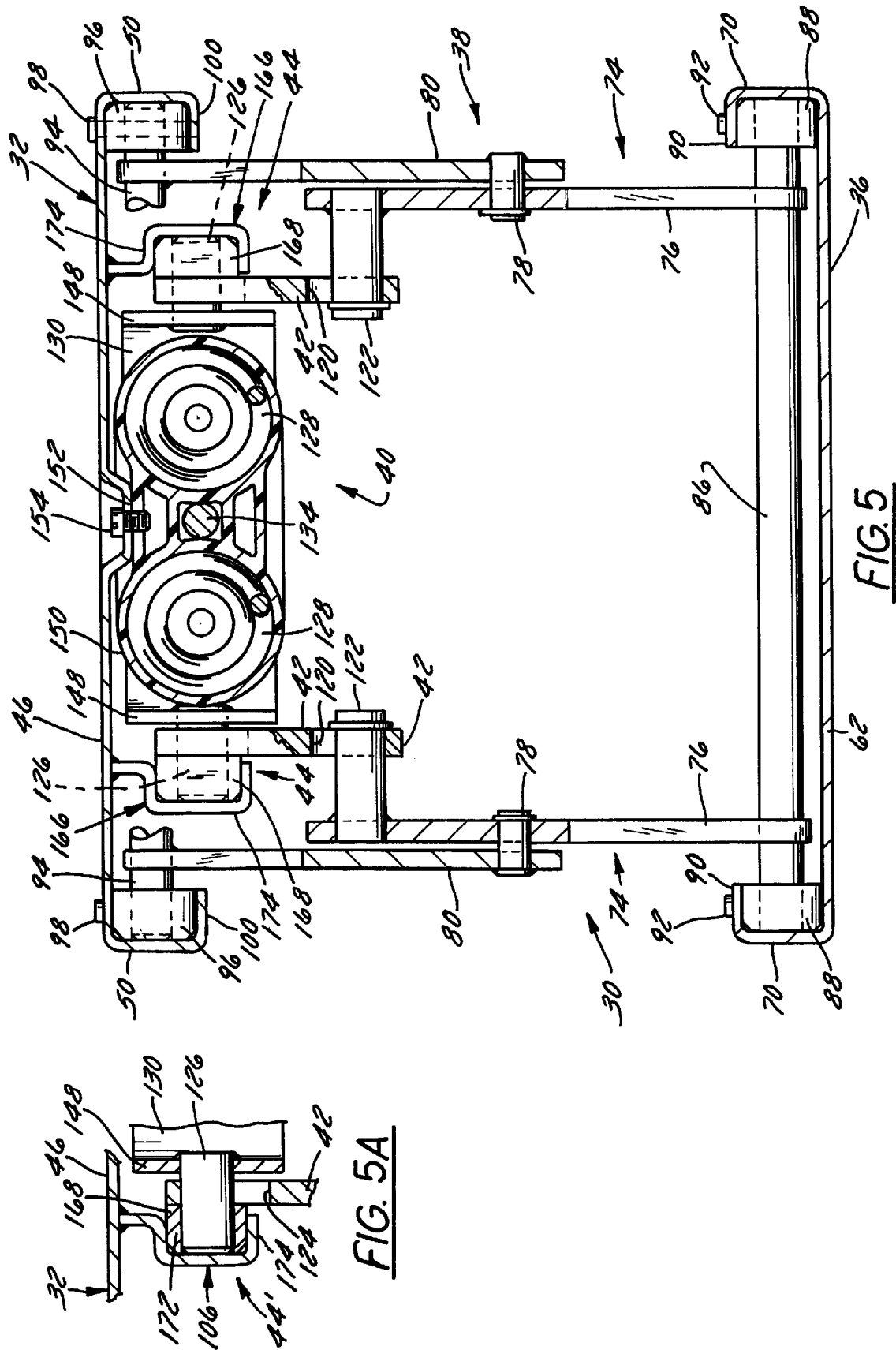
FIG. 5 is a sectional view of the suspension taken along line 5—5 of FIG. 4 showing the slide assemblies and spring carrier assembly in more detail.
FIG. 5A is a partial fragmentary view of a second preferred embodiment of a seat slide using roller bearings.

Referring to FIGS. 5 & 6, the scissor arm linkage assembly 38 comprises a pair of laterally spaced apart scissor linkages 74 disposed between the seat platform 32 and base 34. Each scissor linkage 74 consists of an inner scissor arm 76 pivotally connected by a pivot pin 78 to an outer scissor arm 80 enabling the two arms 76 & 80 to pivot relative to each other about the pivot pin 78 to collapse or expand in response to a load applied to either the seat 34 (platform 32), or base 34 or the seat 34 and the base 34. Each scissor arm 76 & 80 is pivotally fixed at one end to either the base 34 or the platform 32 and slidably pivotally mounted at the other end to either the platform 32 or the base 34. Referring to FIGS. 2 & 3, so that the inner scissor arms 76 move in unison with each other and the outer scissor arms 80 move in unison with each other, the inner scissor arms 76 are connected to each other by a front cross brace 82 and the outer scissor arms 80 are connected to each other by a rear cross brace 84.

As is shown in more detail in FIG. 2, each inner scissor arm 76 is pivotally fixed at its bottom end to the base 34 adjacent the front of the seat suspension 30. Each inner arm 76 is pivotally fixed to the base 34 by being attached to an axle 86 journalled for rotation in the platform 32. The axle 86 preferably is a continuous generally cylindrical rod that extends from adjacent one base sidewall 70 to adjacent the other base sidewall 70 but can be replaced by a pair of stub axles if desired. Each axle end extends outwardly beyond an inner arm 76 and is rotatively received in a bearing or bearing assembly 88, such as is depicted in FIGS. 2 & 3, that is attached to the platform 32 preferably adjacent a corner of the platform 32. The bearing assembly shown in FIG. 2 can either be press fit between the base plate 62 and an inturned lip 90 of the flange 64 or held in place by one or more fasteners 92 that engage both the platform 32 and the bearing assembly 88.

The axle 86 is preferably of metallic construction. The bearing assembly 88 can be a bearing made of metal or nylon which can utilize a plurality of balls or roller bearings to rotatively support the axle 86. In a preferred bearing construction, the bearing assembly 88 is simply a block with a bore in the block for rotatively receiving one end of the axle 86.

Each outer scissor arm 80 is pivotally fixed at its top end to the seat platform 32 adjacent the front end of the seat suspension 30. Each outer scissor arm 80 is pivotally affixed to the seat platform 32 by an axle 94 journalled for rotation in the platform 32. The axle 94 preferably has one end rotatively received in a bearing or bearing assembly 96 disposed against the platform sidewall 50 preferably adjacent the front corner of the platform 32. The axle 94 preferably extends from one of the outer scissor arms 80 to the other of the outer arms 80. The bearing assembly 94 preferably is attached to the platform 32 by one or more fasteners 98 or can be press fit between an inturned lip 100 that extends inwardly from the platform sidewall 50.

To enable the scissor linkage assembly 38 to collapse, the other end of both the inner and outer scissor arms 76 & 80 are movably attached to either the platform 32 or base 34 in a manner which permits the end of each arm 76 & 80 to move in a fore-aft direction along the platform 32 or base 34. Referring to FIGS. 2, 3 & 6, the end of each outer arm 80 is movably attached to the base 34 in a track 102 formed by the base 34, its sidewall 70 and inturned lip 90. To limit movement of the end of each outer arm 80, the track 102 has a front end wall 104 and a rear end wall preferably formed by the rear base wall 68.

To permit each outer arm 80 to move along its track 102, the arm 80 has an outwardly extending stub axle 106 with a bearing 108 received in the track that is attached to the axle 106. The bearing 108 preferably is a round roller or wheel that rotatively rides within the track 102 during operation. If desired, the bearing 108 can be a solid block of a low friction material, such as nylon or the like, which is slidably received within the track 102.

The end of the inner scissor arm 76 is movably constrained to the platform 32 in a track 110 formed by the platform 32, its sidewall 50 and inturned lip 100. To limit forward and rearward movement of the inner arm 76, the track 110 has a front wall 112 and a rear wall that is preferably formed by the rear wall 54. Rotatively mounted on a stub axle 114 attached to the arm 76 is a bearing 116 that is received in the track 110. The bearing 116 preferably is a round roller or wheel that rotatively rides within the track 110 during operation. If desired, the bearing 116 can be a solid block of a low friction material, such as nylon or the like, which is slidably received within the track 110.

To dampen vibration and prevent sudden acceleration or deceleration of the suspension due to severe bumps, jolts, or other more severe suspension loading conditions, the suspension 30 preferably has a dampener 118, that preferably can be a shock absorber, pivotally attached at one end to an arm 80 of the scissor linkage assembly 38 and pivotally attached at its other end to either the platform 32 or base 34. Although a pair of dampeners 118 are shown in the drawing figures, each pivotally attached at one end to the outer arm 80 and at the other end to the platform 32, a single dampener 118 can be used if desired. In fact, the seat suspension 30 of this invention can be used without any such dampener.

To resist collapse of the scissor linkage assembly 38 in response to a load applied either to the platform 32, such as from the weight of a seat occupant, or base 34, such as from jolts encountered during vehicle operation, the spring carrier assembly 40 is operably connected to the assembly 38 by elongate link 42 to each scissor arm linkage 74. Referring to FIG. 2, each connecting link 42 has an oblong opening 120 at one end for receiving a pin 122 fixed to one of the scissor arms of a linkage 74 and an oblong opening 124 at its other end for receiving another pin 126 connecting it to the spring carrier assembly 40. The openings 120 & 124 in each connecting link 42 are preferably larger than the diameter of the pin received in the opening to provide a sufficient amount of play to accommodate suspension travel during operation and particularly for permitting the suspension to nearly fully collapse, such as is shown in FIGS. 7 & 8. As is depicted in FIG. 2, the connecting pin 122 on the scissor arm 76 is spaced from the scissor linkage pivot pin 78 by a distance, d, to cause a moment to be created about the pivot pin 78 in response to a load encountered by the linkage assembly 38 during suspension operation, enabling the load to be transmitted to the spring carrier assembly 40 to thereby enable the scissor linkage assembly 38 to controllably collapse or expand in response to the load as the spring carrier assembly 40 preferably absorbs and helps dissipate the load.

The spring carrier assembly 40 provides resistance to a load applied to the suspension 30. The spring carrier assembly 40 includes a pair of springs 128, that are preferably coil springs held in compression, between a front spring bracket 130 and a rear spring bracket 132, all of which is carried on a weight adjustment rod 134 operably connected to the seat platform 32. A knob 136 is attached to the rod 134 for enabling a seat occupant to grasp and turn the knob 136 to rotate the rod 134 to change the firmness of the suspension 30 by rod rotation varying the distance between the two spring brackets 130 & 132. By varying the distance between the brackets 130 & 132, it varies an amount by which each spring 128 is compressed which changes the weight supporting and load resisting characteristics of the suspension 30.

Each bracket 130 & 132 is constructed of a metal, preferably steel, but can be constructed of aluminum, titanium or another suitable strong and substantially rigid material. Each bracket 130 & 132 can also be constructed of a suitably strong, substantially rigid synthetic material, such as a plastic or composite material.

By applying an amount of pre-compression to each spring 128, the firmness of the suspension 30 is adjustable for seat occupants of different weights. For example, to make the suspension 30 more firm, such as for accommodating a seat occupant of greater weight, the distance between the spring brackets 130 & 132 preferably is lessened thereby compressing the springs 128 more. Conversely, to make the suspension 30 softer, the distance between the brackets 130 & 132 is increased compressing the springs 128 less.

To keep coil springs 128 captive to the brackets 130 & 132, each bracket has a spring keeper 138, 138' which engages both springs 128 to prevent them from sliding away from the bracket and weight adjustment rod 134. Each keeper 138, 138' is mounted to a bracket by at least two fasteners 140. Each keeper 138, 138' preferably has a pair of generally cylindrical cores 142 that each extends into the center of a spring 128 to engage the spring 128 and keep it from sliding outwardly away from the bracket 130, 132 and rod 134.

The rear spring bracket 132 has a pair of inwardly extending bosses 144 which mate with complementary recesses 146 in the keeper 138 to locate and help keep the spring keeper 138 located relative to the bracket 132. By keeping the keeper 138 relatively accurately located on the bracket 132, the springs 128 also remain relatively accurately located relative to the bracket 132 and rod 134 during operation. This interlocking construction also prevents rotation of the keeper 138 relative to the bracket 132.

The front spring keeper 138' is similar to the rear keeper 138 but is not similarly interlocked with the front spring bracket 130. However, the front keeper 138' is constrained by inturned tabs 148 on the front spring bracket 130 to keep it and the springs 128 located relative to the bracket 130 by preventing them from moving outwardly away from the weight adjustment rod 134. Both the front and rear keepers 138, 138' are preferably constructed of a substantially rigid material that preferably can be a plastic, an elastomer, or another synthetic material, such as a composite like glass filled nylon, a carbon composite, or another suitable material or mixture. The keepers 138, 138' can also be constructed of a metal, such as steel, aluminum. titanium or another suitable relatively strong and durable substantially metallic material.

Referring to FIG. 5, to prevent the springs 128 from buckling in the middle, the springs 128 are constrained from moving away from the weight adjustment rod 134 between their ends by a substantially rigid sleeve 150 located between the keepers 138, 138' and which encompasses the periphery of a spring 128. Each spring 128 preferably is constrained by such a sleeve 150, which preferably is constructed of a rigid plastic, a metal or a composite material. Both sleeves 150 preferably are joined by ribs 152 making them of unitary construction with one of the ribs 152 secured to the underside of the platform 46 by a pair of fasteners 154.

At the front of spring bracket 130, there is a collar 156 for facilitating rotation of the weight adjustment rod 134 relative to the bracket 130. Preferably, the collar 156 includes a bearing, as is depicted in FIG. 2, to facilitate smooth rotation of the rod 134 thereby minimizing the effort required to manually rotate the rod 134 to adjust the weight setting of the suspension 30.

The rod 134 can be directly attached to the bracket 130 such that the bracket 130 does not move axially relative to the rod 134 when the rod 134 is rotated. Preferably, however, the rod 134 has a pin 158 through it that functions as a stop and bears against the collar 156 to prevent the bracket 130 from moving relative to the rod 134 when the bracket 130 is pressed against the stop 158 by the springs 128. Preferably, spring tension from the compressively loaded springs 128 will keep the front bracket 130 against the stop 158 while allowing the bracket 130 to move away from the stop 158 toward the rear bracket 132 in response to a load encountered by the suspension 30 during operation enabling the suspension 30 to absorb bumps and jolts encountered during vehicle operation.

The weight adjustment rod 134 has a threaded end 160 that extends through a complementarily threaded portion 162 (FIG. 4) of the rear spring bracket 132. As a result of this construction, spring tension keeps the front bracket 130 against rod stop 158 and rotation of the rod 134 in one direction moves the rear bracket 132 away from the front bracket 130 decreasing the amount of spring compression and rotation of the rod 134 in the other direction moves the rear bracket 132 toward the front bracket 130 compressing the springs. To prevent complete withdrawal of the threaded rod end 160 from the rear bracket 132, there is a pin 164 that extends generally perpendicularly through the rod 134 adjacent the free end of the rod 134.

A connecting pin 126 extends outwardly from each tab 148 of the front bracket 130 through the connecting link 42 and into the slide assembly 44 which is designed to help constrain motion of the springs 128 so that they move substantially linearly during suspension operation. Each connecting pin 126 is immovably affixed to the tab 148 at one end and extends through the opening 124 in the link 42 and cooperates with the slide assembly 44. Each slide assembly 44 comprises a track 166 attached to the seat platform 32 and a bearing 168 received in the track 166 with the bearing 168 attached to the end of the connecting pin 126.

Figure 4:
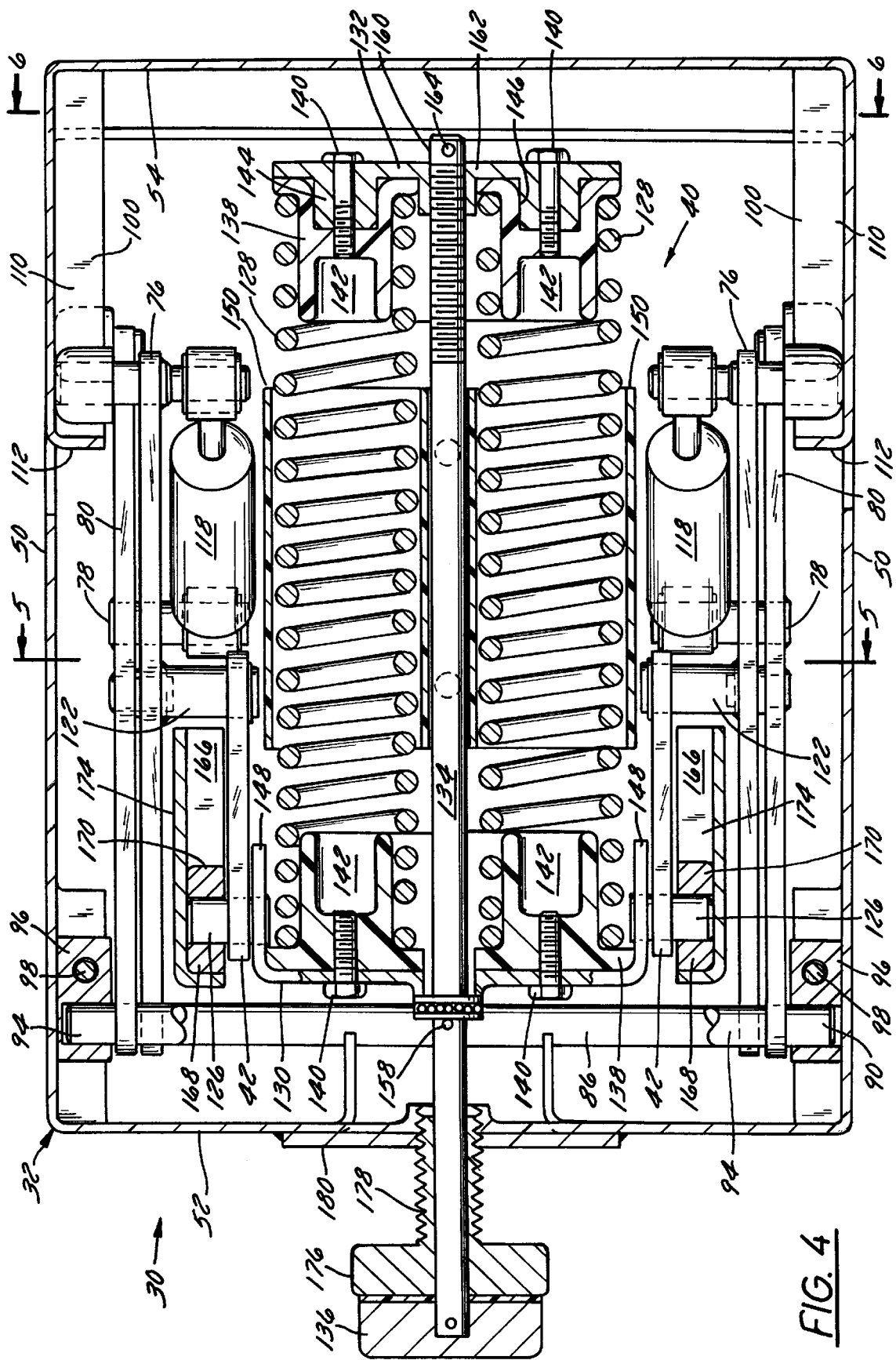
FIG. 4 is a sectional view of the suspension taken along line 4—4 of FIG. 3.

In a first preferred slide embodiment shown in FIGS. 2 & 4, the bearing 168 is a block 170, carried by the pin 126, that slidably rides in the track 166. The bearing block 170 can be constructed of metal but preferably is a solid block of nylon or plastic. In a second preferred slide embodiment shown in more detail in FIG. 5A, the bearing 168 is a roller 172 that rolls along the track 166. The roller 172 is preferably constructed of metal, nylon, a suitable elastomeric material or a plastic. The track 166 preferably is a generally U-shaped metal channel 174 mounted to the underside of the seat platform 32 preferably by welding or by fasteners.

The track 166, as well as each bearing 168, can be lubricated to minimize wear and reduce friction. If desired, the bearing 168 or channel 170 can be impregnated with lubricant or can be of self-lubricating construction.

Although a pair of slides 166, shown in FIG. 4, are preferably used to help guide the motion of the springs 128 and front bracket 130, a single centrally located slide can also preferably be used. Such a central slide preferably includes a bearing block attached to the front spring bracket 130 that extends generally upwardly and is received in a centrally mounted track that is attached to the bottom of the seat platform 32. Referring to FIG. 6, such a track preferably extends in a direction from the front of the platform 32 generally toward the rear of the platform 32 and is located between the springs 128.

As is shown in FIGS. 3 & 4, the weight adjustment knob 136 extends outwardly from the front of the seat platform 32 so it can conveniently be grasped by a seat occupant and rotated to adjust the firmness of the suspension 30, preferably to tailor its characteristics for the weight and comfort level desired by the seat occupant. The weight adjustment rod 134 extends from the knob 136 through another knob 176 for adjusting the height of the suspension 30 to enable the seat occupant to adjust seat height.

The height adjustment knob 176 has a threaded shank 178 threaded into a complementarily threaded portion 180 of the front wall 52 of the seat platform 32. Rotation of the height adjustment knob 176 moves the entire spring carrier assembly 40 toward or away from the front of the platform 32 raising or lowering the seat platform height by increasing or decreasing the distance between the platform 32 and base 34.

As the height adjustment knob 176 is rotated such that it extends the knob 176 further outwardly from the front of the platform 32, it moves (a) the weight adjustment knob 136, (b) the weight adjustment rod 134, (c) the spring brackets 130 & 132, (d) the springs 128, and (e) the connecting pins 126 and links 42 forwardly substantially in unison with the outward displacement of the height adjustment knob 176. Referring to FIG. 3, as the spring carrier assembly 40 moves toward the front of the platform 32, it causes each connecting link 42 to pivot slightly upwardly about pin 122 and transmits a force along each connecting link 42 to the inner scissor arm 76 creating a moment about the pivot pin 78 causing the scissors arm linkages 74 to expand thereby raising the height of the platform 32 relative to the base 34.

As the height adjustment knob 176 is rotated such that it is screwed into the seat platform 32, the spring carrier assembly 40 moves toward the rear of the seat platform 32. As the spring carrier 40 moves toward the rear of the spring platform 32, each connecting link 42 pivots downwardly about pin 122 lessening the force applied through the links 42 to the inner scissor arms 76 causing the scissor arm linkages to collapse thereby lowering the height of the seat platform 32.

Since height adjustment moves both springs 128 in unison without changing how much the springs 128 are compressed, height adjustment does not affect the firmness or softness of the suspension 30. Since weight adjustment is performed by spreading the spring brackets 130 & 132 apart by moving the spring bracket 132 that is opposite the bracket 130 to which the links 42 are attached, weight adjustment does not change the height of the seat 34. As a result, weight adjustment is substantially independent from height adjustment and height adjustment is substantially independent from weight adjustment.

In operation, a person who is going to sit on the seat 34 reaches underneath the seat 34 to rotate either or both the height adjustment knob 176 and the weight adjustment knob 136. In a preferred seat suspension embodiment, the height adjustment knob 176 is rotated counterclockwise to raise seat height and clockwise to lower seat height. To adjust the suspension 30 to accommodate the weight of the seat occupant, the weight adjustment knob 136 is rotated counterclockwise to increase the firmness of the suspension 30 and clockwise to make the suspension 30 softer.

During operation of a vehicle equipped with a seat suspension 30 of this invention, loads are encountered by the seat suspension 30 in response to bumps, jolts and shocks, as well as the weight of a seat occupant. As a load is encountered, the seat suspension 30 deflects causing it to collapse at least slightly resulting in the platform 32 moving generally downwardly toward the base 34. As a load is encountered, its force is transmitted through the inner scissor arms 76 to the links 42 which in turn transmit the load to the front spring bracket 130. As the load is transmitted to the front bracket 130, the bracket 130 transmits the load to the springs 130 causing the springs 130 to compress at least slightly. By the springs 128 resisting compression, they cause the scissor linkage assembly 38 to resist collapse and also dissipate the load encountered. Preferably, the springs 128 work in combination with the dampener 118 to minimize the harshness of the load applied to the suspension 30 by minimizing acceleration of the seat platform 32 relative to the base 34. Preferably, the dampener 118 and spring carrier assembly 40 also work together to dampen or absorb suspension vibration including vibration transmitted to the suspension 30 from the vehicle.

To ship the seat suspension 30 after assembly for final assembly to a vehicle, the suspension 30 can be collapsed as shown in FIGS. 7 & 8. To fully collapse the suspension 30, the height adjustment knob 176 is screwed into the seat platform 32 as far as it can go. An external force may be applied to further collapse the scissor linkages to the fully collapsed position shown in FIGS. 7 & 8. If desired, a retainer, in the form of a metal strap or a similar suitable retainer can be used to retain the suspension 30 in the fully collapsed position.

To make the suspension 30 as quiet as possible, the seat suspension 30 can be constructed with a layer of sound-proofing or sound dampening material between the spring carrier assembly 40 and the underside of the seat platform 32. Although the spring carrier assembly 40 is located just underneath the bottom of the platform 32, the spring carrier 40 can be located adjacent or against the seat base 34. If located adjacent the base 34, the scissor linkage assembly 38 would be disposed upside down from that shown in the drawing figures.

The suspension 30 of this invention preferably uses compression springs 128, but can be modified to use tension springs, if desired. If modified to use tension springs, the links 42 would be attached to the rear spring bracket 132 with the rear spring bracket 132 free to move axially along the weight adjustment rod 134. In this modified embodiment, the front spring bracket 130 preferably is threadably engaged with the weight adjustment rod 134 such that rotation of the rod 134 moves the front bracket 130 relative to the rear bracket 132 to change spring tension thereby changing the firmness or softness of the suspension 30. In this modified suspension embodiment, one end of both springs 128 is preferably affixed to one bracket 130 for movement in unison therewith and the other end of both springs 128 is preferably affixed to the other bracket 132 for movement in unison therewith for enabling the tension in the springs 128 to be changed by changing the distance between the two brackets 130 & 132.

Although the spring carrier 40 preferably uses a pair of springs 128, a single spring 128 can be used if desired. Additionally, more than two springs 128 can be used, held captive between spring brackets 130 & 132 in the above described manner.

It is also to be understood that, although the foregoing description and drawings describe and illustrate in detail one or more embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims and the applicable prior art.

What is claimed is:

1. A vehicle seat suspension comprising:
    (a) a base;
    (b) a platform 1) that is spaced from said base, 2) that overlies said base, and 3) that carries a seat;
    (c) a scissors linkage in operable communication with said base and said platform for enabling said platform to move relative to said base, said scissors linkage having one scissors arm pivotally connected to another scissors arm;
    (d) a spring 1) that is disposed between said platform and said base, 2) that opposes movement of one of said platform and said base toward the other of said platform and said base, 3) that is movable relative to one of said base and said platform, and 4) that carries a guide;
    (e) a slide carried by one of said platform and said base and having a channel;
    (f) a link operatively connected to one of said scissors arms and said spring; and
    (g) wherein said guide of said spring is received in said channel of said slide such that said guide is movable within said channel relative to said slide such that said slide substantially linearly guides movement of said spring.

2. The vehicle seat suspension of claim 1 wherein said seat is carried on top of said platform, said slide is secured to the bottom of said platform and said spring is a coil spring carried by said platform wherein said link communicates movement of said scissor linkage to said spring and said spring opposes collapse of said scissor linkage.

3. The vehicle seat suspension of claim 1 wherein said spring is a coil spring and further comprising a pair of brackets keeping captive said spring in compression with one of said brackets disposed at one end of said spring, said one bracket operatively connected to said link, and the other of said brackets disposed at the other end of said spring wherein one of said brackets is constructed and arranged to be movable relative to the other of said brackets for changing the amount by which said spring is compressed for changing the resistance of the suspension to a load.

4. The vehicle seat of claim 3 wherein 1) said seat platform has a front end and a rear end, and 2) said brackets and spring form a spring carrier assembly that is movable in unison toward or away from said front end of said platform to change the distance between said platform and said base to change seat height.

5. The vehicle seat of claim 4 wherein movement of said spring carrier assembly displaces said link causing said scissor linkage to collapse or expand thereby changing the distance between said platform and said base.

6. The vehicle seat of claim 1 wherein said spring is a coil spring, said platform has a front end and a rear end, and further comprising a pair of brackets keeping captive said spring in compression with one of said brackets disposed at one end of said spring, said one bracket operatively connected to said link, and the other of said brackets disposed at the other end of said spring, said brackets and springs defining a spring carrier assembly constructed and arranged to be movable toward or away from said front end of said platform to change the distance between said platform and said base to increase or decrease seat height.

7. The vehicle seat of claim 6 wherein movement of said spring carrier assembly displaces said link causing said scissor linkage to collapse or expand thereby changing the distance between said platform and said base.

8. The vehicle seat of claim 1 further comprising
    1) a pair of brackets keeping captive said spring in compression with one of said brackets disposed at one end of said spring, said one bracket operatively connected to said link, and the other of said brackets disposed at the other end of said spring;
    2) a weight adjustment rod operably connected to both said brackets wherein rotation of said rod changes the distance between said brackets to change the amount by which said spring is compressed by said brackets;

3) a weight adjustment knob extending outwardly of said platform which is operably connected to said rod for rotating said rod by turning said knob;

4) a height adjustment knob threadably carried by said platform which cooperates with said weight adjustment rod such that rotation of said height adjustment knob moves said rod, brackets and spring substantially in unison relative to said platform to change the distance between said platform and said base by expanding or collapsing said scissor linkage.

9. The vehicle seat suspension of claim 8 wherein said weight adjustment rod extends outwardly from said weight adjustment knob and is telescopically received through said height adjustment knob wherein said height adjustment knob has an outwardly extending threaded shank threadably engaged with said platform and rotation of said height adjustment knob moves said weight adjustment knob, said rod, said brackets and said spring relative to said platform.

10. The vehicle seat suspension of claim 1 wherein said guide comprises a bearing block slidably received in said channel.

11. The vehicle seat suspension of claim 1 wherein said guide comprises a roller received in said channel.

12. The vehicle seat suspension of claim 1 wherein said slide is affixed to the bottom of said platform.

13. The vehicle seat suspension of claim 1 further comprising a bracket carried by said spring and which operatively connects said link to said spring.

14. The vehicle seat suspension of claim 13 wherein said guide is carried by said bracket.

15. The vehicle seat suspension of claim 14 wherein said guide comprises an outwardly extending pin.

16. The vehicle seat suspension of claim 15 further comprising a pair of brackets keeping captive said spring in compression with one of said brackets disposed at one end of said spring and the other of said brackets disposed at the other end of said spring wherein said pin is attached at one end to one of said brackets, and said spring is a coil spring.

17. The vehicle seat of claim 16 further comprising a keeper carried by each said bracket with said keeper having a generally cylindrical outwardly extending boss received in said spring to prevent said spring from sliding off said bracket.

18. The vehicle seat of claim 17 further comprising a generally cylindrical substantially rigid sleeve around said spring to prevent said spring from buckling.

19. The vehicle seat suspension of claim 14 wherein said guide comprises a block.

20. The vehicle seat suspension of claim 19 wherein said block is comprised of nylon.

21. The vehicle seat suspension of claim 14 wherein said guide comprises a block carried by a pin that extends from said bracket with said block received in said channel.

22. The vehicle seat suspension of claim 14 wherein said guide comprises a bearing.

23. A seat suspension comprising:

(a) a base;

(b) a platform 1) spaced from said base, 2) having a front end and a rear end, 3) generally overlying said base, and 4) carrying a seat;

(c) a scissors linkage assembly in operable communication with said base and said platform for enabling said platform to move relative to said base, said scissors linkage assembly having a pair of spaced apart scissor linkages, each said scissor linkage having one scissor arm pivotally connected to another scissor arm with one end of each said scissor arm in pivotal cooperation with said platform and the other end of each said scissor arm in pivotal cooperation with said base;

(d) a pair of coil springs disposed between said platform and said base;

(e) a pair of spaced apart brackets keeping captive said springs in compression with one of said brackets disposed at or adjacent one end of said springs and the other of said brackets disposed at or adjacent the other end of said springs;

(f) a slide fixed to said platform;

(g) a guide operatively connecting said slide to one of said brackets such that movement of said bracket and said springs is guided frontwardly or rearwardly relative to said platform;

(h) a link pivotally connecting one of said scissor arms of each said scissor linkage to one of said brackets; and (i) a rod operatively connected to said brackets with said rod having a threaded portion that cooperates with one of said brackets wherein rotation of said rod changes the distance between said brackets changing the amount by which each said spring is compressed thereby changing the resistance of the suspension to a load.

24. The seat suspension of claim 23 further comprising means for moving said springs and brackets substantially in unison relative to said platform to expand or collapse said scissor linkages to change the between said platform and said base.

25. The seat suspension of claim 23 wherein said threaded portion threadably enagages said one of said brackets and further comprising a stop on said rod adjacent the other of said brackets for limiting movement of the other of said brackets and said springs relative to said rod.

26. The seat suspension of claim 23 wherein said slide and said guide are slidably engaged.

27. The seat suspension of claim 26 wherein said guide is carried by one of said brackets and is received in a channel of said slide.

28. A vehicle seat suspension comprising:

a base;

a platform generally overlying said base and carrying a seat;

a linkage assembly disposed between said base and said platform in cooperation with said base and said platform wherein said linkage assembly is constructed and arranged to be 1) capable of expanding such that said platform moves farther away from said base, increasing a spacing between said platform and said base, and 2) capable of collapsing such that said platform moves closer to said base, decreasing said spacing between said platform and said base;

a spring assembly comprising 1) a spring i) that is disposed between said platform and said base and ii) that opposes collapse of said linkage assembly, and 2) a pair of brackets carried by said spring that are spaced apart by a distance;

a slide operatively connecting said spring assembly to one of said platform and said base and which guides movement of at least one of said brackets relative to said platform and said base;

a substantially rigid connecting link operatively connecting said linkage assembly to said spring assembly;

a weight adjustment rod in operable cooperation with both of said brackets wherein rotation of said weight adjustment rod changes said distance between said brackets which changes the tension of said spring thereby changing the resistance of the vehicle seat suspension to the weight of a seat occupant; and a height adjuster that cooperates with said spring assembly such that movement of said height adjuster moves said brackets and said spring substantially in unison and movement of said brackets and said spring substantially in unison causes said distance between said platform and said base to change by causing said linkage assembly to expand or collapse.

29. The vehicle seat suspension of claim 28 wherein said linkage assembly comprises a linkage having a first arm pivotally connected to a second arm wherein said connecting link 1) is pivotally connected to one of said brackets and 2) is pivotally connected to one of said first and second arms of said linkage assembly.

30. The vehicle seat suspension of claim 28 wherein said slide comprises a first portion carried by one of said platform and said base and a second portion carried by said spring assembly wherein said first portion and said second portion cooperate with each other in a manner that permits relative movement between said first portion and said second portion.

31. The vehicle seat suspension of claim 30 wherein said first portion and said second portion slidably cooperate with each other.

32. The vehicle seat suspension of claim 30 wherein one of said first portion and said second portion comprises a track and the other of said first portion and said second portion comprises a guide.

33. The vehicle seat suspension of claim 32 wherein said track is carried by one of said platform and said bases and said guide 1) is carried by said spring assembly and 2) cooperates with said track.

34. The vehicle seat suspension of claim 33 wherein said track has a channel and said guide is received in said channel.

35. The vehicle seat suspension of claim 34 wherein said guide comprises a finger received in said channel.

36. The vehicle seat suspension of claim 35 wherein said finger is carried by one of said brackets.

37. The vehicle seat suspension of claim 33 wherein said slide substantially linearly guides motion of said spring assembly.

38. The vehicle seat suspension of claim 33 wherein said finger further comprises a block carried by a pin.

39. The vehicle seat suspension of claim 28 wherein said slide comprises:
1) a pair of tracks carried by one of said platform and said base with each said track having a channel therein; and
2) a pair of fingers carried by said spring assembly with each said finger received in one of said channels.

40. The vehicle seat suspension of claim 39 wherein said tracks are spaced apart with one of said tracks being disposed outwardly of said spring assembly toward one side of said spring assembly and the other of said tracks being disposed outwardly of said spring assembly toward another side of said spring assembly.

41. The vehicle seat suspension of claim 28 wherein said brackets capture said spring in compression with said weight adjustment rod having 1) a threaded portion that threadably engages one of said brackets and 2) a stop that cooperates with the other of said brackets such that 1) rotation of said weight adjustment rod in one direction decreases said distance between said brackets thereby increasing compression of said spring and 2) rotation of said weight adjustment rod in another direction increases said distance between said brackets thereby decreasing compression of said spring.

42. The vehicle seat suspension of claim 41 wherein one of said brackets is disposed at one end of said spring and the other said brackets is disposed at an opposite end of said spring.

43. The vehicle seat suspension of claim 41 wherein said spring assembly comprises a pair of said springs in parallel with both said springs captured in compression by said brackets.

44. The vehicle seat suspension of claim 28 wherein said height adjuster comprises a height adjustment knob that is threaded into said platform and which is coupled to said weight adjustment rod such that 1) rotation of said height adjustment knob in one direction moves said weight adjustment rod, said spring and said brackets substantially in unison in one direction thereby collapsing said linkage assembly and decreasing the spacing between said platform and said base, and 2) rotation of said height adjustment knob in an opposite direction moves said weight adjustment rod, said spring and said brackets substantially in unison in an opposite direction thereby expanding said linkage assembly and increasing the spacing between said platform and said base.

45. The vehicle seat suspension of claim 44 further comprising a weight adjustment knob 1) that cooperates with said weight adjustment rod such that said weight adjustment rod rotates when said weight adjustment knob is turned and 2) that couples said height adjustment knob to said weight adjustment rod.

46. The vehicle seat suspension of claim 45 wherein said weight adjustment knob is fixed to said weight adjustment rod such that said weight adjustment knob and said weight adjustment rod rotate substantially in unison.

47. The vehicle seat suspension of claim 45 wherein said height adjustment knob is coupled by said weight adjustment knob to said weight adjustment rod in a manner that permits relative rotation between said height adjustment knob and said weight adjustment rod.

48. A vehicle seat suspension comprising:
a base;
a platform generally overlying said base and carrying a seat;
a scissors linkage assembly disposed between said base and said platform in cooperation with said base and said platform wherein said scissors linkage assembly 1) has a first scissors arm pivotally connected to a second scissors arm, 2) is capable of expanding such that said platform moves farther away from said base, and 3) is capable of collapsing such that said platform moves closer to said base;
a spring assembly operatively connected to said scissors linkage assembly and which comprises 1) a coil spring i) that is disposed between said platform and said base and ii) that opposes collapse of said linkage assembly, and 2) a pair of brackets that are spaced apart by a distance, wherein said spring assembly is movable relative to at least one of said base and said platform; and
a slide assembly operatively connecting said spring assembly to one of said platform and said base wherein said slide assembly substantially linearly guides movement of said spring assembly relative to at least one of said platform and said base.

49. The vehicle seat suspension of claim 48 further comprising a substantially rigid connecting link operatively connecting said spring assembly to one of said scissors arms wherein said connecting link is 1) pivotally connected to one of said brackets of said spring assembly and 2) pivotally connected to one of said scissors arms of said scissors linkage assembly.

50. The vehicle seat suspension of claim 48 wherein said slide assembly comprises a first portion carried by one of said platform and said base and a second portion carried by said spring assembly wherein said first portion and said second portion cooperate with each other in a manner that permits relative movement between said first portion and said second portion.

51. The vehicle seat suspension of claim 50 wherein said first portion and said second portion slidably cooperate with each other.

52. The vehicle seat suspension of claim 50 wherein one of said first portion and said second portion comprises a track and the other of said first portion and said second portion comprises a guide.

53. The vehicle seat suspension of claim 52 wherein said track is carried by one of said platform and said base, and said guide 1) is carried by said spring assembly and 2) cooperates with said track.

54. The vehicle seat suspension of claim 53 wherein said track has a channel and said guide is received in said channel.

55. The vehicle seat suspension of claim 54 wherein said guide comprises a finger received in said channel.

56. The vehicle seat suspension of claim 55 wherein said finger comprises a bearing received in said channel.

57. The vehicle seat suspension of claim 55 wherein said finger is carried by one of said brackets.

58. The vehicle seat suspension of claim 53 wherein said track is fixed to one of said platform and said base.

59. The vehicle seat suspension of claim 48 wherein said slide assembly comprises:

1) a pair of tracks carried by one of said platform and said base with each said track having a channel therein; and 2) a pair of fingers carried by said spring assembly with each said finger received in one of said channels.

60. The vehicle seat suspension of claim 59 wherein said tracks are spaced apart with one of said tracks being disposed outwardly of said spring assembly toward one side of said spring assembly and the other of said tracks being disposed outwardly of said spring assembly toward another side of said spring assembly.

61. A vehicle seat suspension comprising:

a base;

a platform having a front end, a rear end, and a longitudinal axis extending from said rear end toward said front end, wherein said platform generally overlies said base and carries a seat;

a scissors linkage assembly in operable communication with said base and said platform for enabling said platform to move relative to said base, said scissors linkage assembly having a pair of spaced apart scissors linkages, each said scissors linkage having one scissors arm pivotally connected to another scissors arm;

a coil spring disposed between said platform and said base for opposing movement of said platform toward said base wherein said coil spring is oriented such that a longitudinal axis of said coil spring is generally parallel to said longitudinal axis of said platform; and a slide operatively connecting said coil spring to one of said platform and said base wherein said slide constrains movement of said coil spring relative to said platform substantially linearly along a direction generally parallel to said longitudinal axis of said platform.

62. The seat suspension of claim 61 further comprising:

a pair of spaced apart brackets in operable cooperation with said coil spring for capturing said coil spring in compression with one of said brackets disposed adjacent one end of said spring and the other of said brackets disposed adjacent the other end of said spring; and a pair of connecting links with one of said connecting links operatively connecting one of said brackets to one of said scissors arms of one of said scissors linkage assemblies and the other of said connecting links operatively connecting one of said brackets to the other one of said scissors linkage assemblies.

63. A vehicle seat suspension comprising:

a base;

a platform having a front end, a rear end, and a longitudinal axis extending from said rear end toward said front end, wherein said platform generally overlies said base and carries a seat;

a scissors linkage assembly in operable communication with said base and said platform for enabling said platform to move relative to said base, said scissors linkage assembly having a pair of spaced apart scissors linkages, each said scissors linkage having one scissors arm pivotally connected to another scissors arm;

a coil spring disposed between said platform and said base for opposing movement of said platform toward said base wherein said coil spring is oriented such that a longitudinal axis of said coil spring is generally parallel to said longitudinal axis of said platform;

a pair of brackets carried by said coil spring and which are spaced apart by a distance;

a slide operatively connecting said coil spring to one of said platform and said base wherein said slide constrains movement of said coil spring relative to said platform generally rearwardly or forwardly relative to said platform;

a first substantially rigid connecting link operatively connecting one of said brackets to one of said scissors arms of one of said scissors linkages;

a second substantially rigid connecting link operatively connecting said one of said brackets to one of said scissors arms of the other of said scissors linkages;

a weight adjustment rod operatively connected to both of said brackets wherein rotation of said weight adjustment rod changes said distance between said brackets thereby changing the tension of said coil spring for changing the resistance of said spring to collapse of said scissors linkage assembly.

64. The vehicle seat suspension of claim 63 wherein 1) said first connecting link is i) pivotally connected to said one of said brackets and ii) pivotally connected to said one of said scissors arms of said one of said scissors linkages, and 2) said second connecting link is i) pivotally connected to said one of said brackets, and ii) pivotally connected to said one of said scissors arms of said other of said scissors linkages.

65. The vehicle seat suspension of claim 63 wherein said slide constrains movement of said coil spring and said brackets along a direction that is generally parallel to said longitudinal axis of said platform.

66. A vehicle seat suspension comprising:

a base;

a platform having a front and a rear with said platform spaced from said base and carrying a seat;

a linkage assembly disposed between said base and said platform and permitting a variation in the spacing between said base and said platform;

a spring carriage assembly operatively connected to one of said base and said platform by a slide assembly that guides movement of said spring carriage assembly frontwardly or rearwardly relative to said one of said base and said platform, said spring carriage assembly including a coil spring that 1) has a pair of ends spaced apart by a distance, 2) has a preload, and 3) which opposes collapse of said linkage assembly;

a link operatively connecting said spring carriage assembly to said linkage assembly;

a weight adjustment assembly constructed and arranged to change said distance between said ends of said coil spring to thereby change said preload; and a height adjustment assembly constructed and arranged to move said coil spring relative to one of said platform and said base to change said spacing between said platform and said base.

67. A vehicle seat suspension comprising:

a base;

a platform having a front and a rear with said platform spaced from said base and carrying a seat;

a scissors linkage assembly disposed between said base and said platform and permitting said spacing between said base and said platform to be varied;

a spring carriage assembly operatively connected to one of said base and said platform by a slide assembly that guides movement of said spring carriage assembly frontwardly or rearwardly relative to said one of said base and said platform, said spring carriage assembly including a coil spring that 1) has a pair of ends spaced apart by a distance, 2) has a preload, and 3) which opposes collapse of said scissors linkage assembly thereby opposing movement of said platform toward said base;

a link operatively connecting said spring carriage assembly to said scissors linkage assembly;

a weight adjustment assembly constructed and arranged to change said distance between said ends of said coil spring to thereby change said preload without changing said spacing between said platform and said base; and a height adjustment assembly constructed and arranged to move said coil spring relative to one of said platform and said base to change said spacing between said platform and said base without changing said distance between said ends of said coil spring.

* * * * *